(12) United States Patent
Kleinau et al.

(10) Patent No.: US 10,800,414 B2
(45) Date of Patent: Oct. 13, 2020

(54) AUTOMATIC CONTROLLER OF A VEHICLE DURING STARTING

(71) Applicant: VOLKSWAGEN AKTIENGESELLSCHAFT, Wolfsburg (DE)

(72) Inventors: Sandra Kleinau, Rötgesbüttel (DE); Teodor Buburuzan, Braunschweig (DE); Bernd Lehmann, Wolfsburg (DE); Bernd Rech, Bokensdorf (DE); Monique Engel, Braunschweig (DE); Stefan Gläser, Braunschweig (DE); Hendrik-Jörn Günther, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 152 days.

(21) Appl. No.: 15/775,032

(22) PCT Filed: Nov. 10, 2016

(86) PCT No.: PCT/EP2016/077305
§ 371 (c)(1),
(2) Date: May 10, 2018

(87) PCT Pub. No.: WO2017/084963
PCT Pub. Date: May 26, 2017

(65) Prior Publication Data
US 2018/0319400 A1 Nov. 8, 2018

(30) Foreign Application Priority Data
Nov. 19, 2015 (DE) .......... 10 2015 222 805

(51) Int. Cl.
*G01C 22/00* (2006.01)
*G05D 1/00* (2006.01)
(Continued)

(52) U.S. Cl.
CPC ..... *B60W 30/18027* (2013.01); *G05D 1/0088* (2013.01); *G08G 1/09675* (2013.01);
(Continued)

(58) Field of Classification Search
CPC ..... B60W 30/18027; B60W 30/18163; B60W 30/18; H04W 4/46; G05D 1/0088;
(Continued)

(56) References Cited

U.S. PATENT DOCUMENTS

2009/0276135 A1  11/2009  Hagemann et al.
2010/0125402 A1* 5/2010 Bansal .............. G08G 1/07
                                                    701/117
(Continued)

FOREIGN PATENT DOCUMENTS

CN  101193768 A  6/2008
CN  103171555 A  6/2013
(Continued)

OTHER PUBLICATIONS

Search Report for German Patent Application No. 10 2015 222 805.3; dated Aug. 30, 2016.
(Continued)

*Primary Examiner* — Mahmoud S Ismail
(74) *Attorney, Agent, or Firm* — Barnes & Thornburg LLP

(57) ABSTRACT

A method for a semi-automatic or automatic controller of a transportation vehicle during starting to prevent an accordion effect when starting the transportation vehicle in a queue of transportation vehicles. A driving intention message is received from a further transportation vehicle which displays information relating to a planned starting process of the further transportation vehicle. It is also determined whether the further transportation vehicle is located directly in front of the transportation vehicle. If it is determined that
(Continued)

the further transportation vehicle is located directly in front of the transportation vehicle, a parameter for the semi-automatic or automatic controller of the transportation vehicle is determined based on the received driving intention message.

12 Claims, 3 Drawing Sheets

(51) Int. Cl.
| | | |
|---|---|---|
| *G08G 1/00* | (2006.01) | |
| *B60W 30/18* | (2012.01) | |
| *G08G 1/0967* | (2006.01) | |
| *H04W 4/46* | (2018.01) | |
| *G06G 7/70* | (2006.01) | |
| *G06G 7/76* | (2006.01) | |
| *B60W 50/00* | (2006.01) | |

(52) U.S. Cl.
CPC . *G08G 1/096725* (2013.01); *G08G 1/096783* (2013.01); *G08G 1/096791* (2013.01); *G08G 1/22* (2013.01); *H04W 4/46* (2018.02); *B60W 2050/008* (2013.01); *B60W 2554/4041* (2020.02); *B60W 2554/801* (2020.02); *B60W 2556/65* (2020.02); *G05D 2201/0213* (2013.01)

(58) Field of Classification Search
CPC ....... G08G 1/096725; G08G 1/096783; G08G 1/096791; G08G 1/22
USPC .................................................. 701/23, 117
See application file for complete search history.

(56) References Cited

U.S. PATENT DOCUMENTS

| | | | |
|---|---|---|---|
| 2016/0229409 A1* | 8/2016 | Pascheka | B60W 30/18145 |
| 2018/0079419 A1* | 3/2018 | Yamamoto | B60W 30/18163 |

FOREIGN PATENT DOCUMENTS

| | | |
|---|---|---|
| DE | 102008036131 A1 | 3/2009 |
| DE | 102008042306 A1 | 4/2010 |
| DE | 102010013647 A1 | 2/2011 |
| DE | 102011107142 A1 | 1/2012 |
| DE | 102011009483 A1 | 7/2012 |
| DE | 102011118252 A1 | 5/2013 |
| DE | 102011121442 A1 | 6/2013 |
| DE | 102012201982 A1 | 8/2013 |
| DE | 102012014281 A1 | 5/2014 |
| DE | 102015202451 A1 | 8/2016 |
| EP | 2738751 A1 | 6/2014 |
| WO | 2006131421 A1 | 12/2006 |

OTHER PUBLICATIONS

Search Report for International Patent Application No. PCT/EP2016/077305; dated Feb. 10, 2017.
Office Action for Chinese Patent Application No. 201680067577.1; dated Jun. 12, 2020.

* cited by examiner

AUTOMATIC CONTROLLER OF A VEHICLE DURING STARTING

PRIORITY CLAIM

This patent application is a U.S. National Phase of International Patent Application No. PCT/EP2016/077305, filed 10 Nov. 2016, which claims priority to German Patent Application No. 10 2015 222 805.3, filed 19 Nov. 2015, the disclosures of which are incorporated herein by reference in their entireties.

SUMMARY

Illustrative embodiments relate to an automatic control of a transportation vehicle when starting, in particular, an automatic longitudinal control of the transportation vehicle when starting.

BRIEF DESCRIPTION OF THE DRAWINGS

Disclosed embodiments will be described in detail below with reference to the drawings, in which.

DETAILED DESCRIPTION

Figure 1:
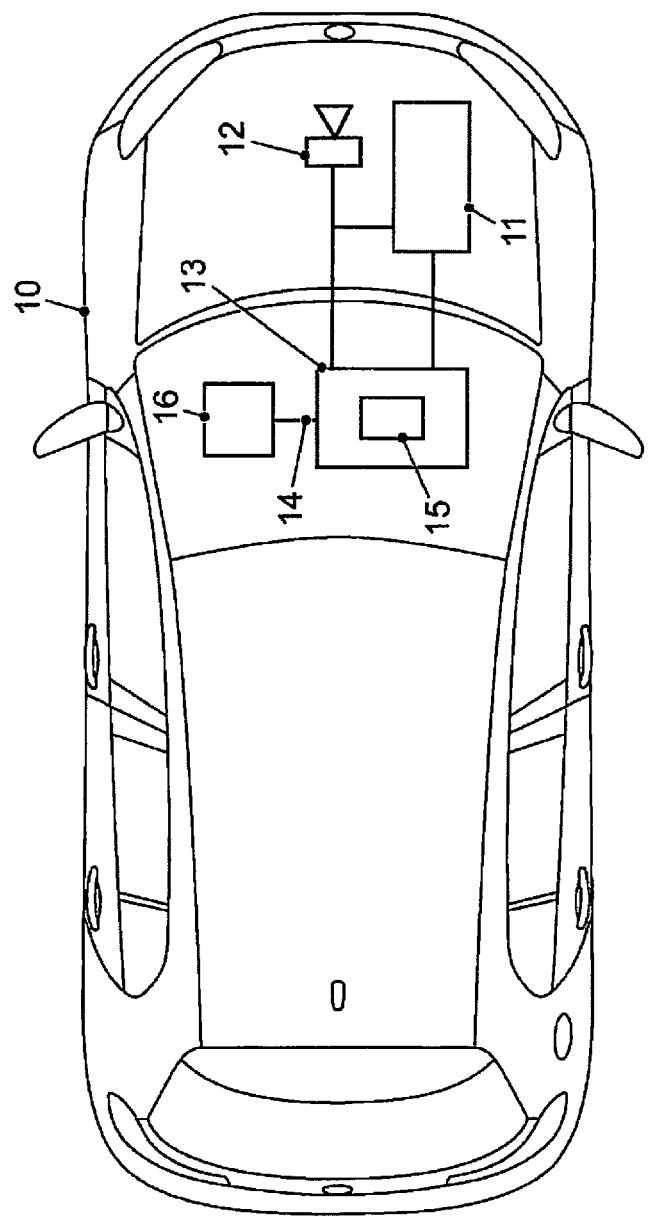
FIG. 1 schematically depicts a disclosed embodiment of a transportation vehicle including a device for activating semi-automated/automatic control of the transportation vehicle when starting.

When a line of transportation vehicles starts moving at a traffic light, intersection, or on-ramp, a so-called accordion effect may be observed. In an accordion effect, the distances between the transportation vehicles, in particular, between the first transportation vehicles, increase substantially. This may be caused by delayed starting due to the reaction times of the drivers. As a result, fewer transportation vehicles are able to pass through the stop line of the traffic light, the intersection, or the on-ramp, than would be possible in principle. Such an accordion effect may be observed even with transportation vehicles having an automatic longitudinal control, since the automatic longitudinal control systems also introduce certain delays due to the analysis of the driving behavior of the leading transportation vehicle, and due to the maintenance of generally ordinary and comfortable distances from the leading transportation vehicle.

In this context, DE 10 2011 009 483 A1 discloses a method for operating a longitudinally guiding driver assistance system of a motorized transportation vehicle. If multiple motorized transportation vehicles which are equipped with a longitudinally guiding driver assistance system travel in succession in a platoon, problems may occur, in particular, in the low-speed range. In particular, in so-called stop-and-go operation, in the case of longitudinally guided platoon travel, an "oscillation" of the control may occur, so that a type of accordion effect, and thus an inefficient driving style having sharp accelerations and sharp decelerations, may occur. The causes for these undesirable effects lie, for example, in the delay times of the sensor systems and the actuator systems, and in the time constants of the longitudinal guidance. Delays in the sensor domain are based mostly on the type of evaluation, if, for example, data are plausibility checked, or thresholds which are otherwise conducive to the safety of the detection must be surpassed. The time constants of the longitudinal control of a longitudinally guiding driver assistance system are primarily parameterized from the point of view of driving comfort with respect to typical and frequent traffic situations. To solve this problem, it is therefore proposed to identify the specific situation of a platoon made up of at least three transportation vehicles having actively operated longitudinally guiding driver assistance systems. By suitably re-parameterizing the longitudinal control, sensor system, and/or actuator system in a manner which is adapted to the situation, it is ensured that the specific situation of platoon travel is managed. In at least one disclosed embodiment, it is provided that a platoon value ultimately contains a binary determination of whether or not transportation vehicles are traveling in a longitudinally guided platoon. If longitudinally guided platoon travel is detected, an operating parameter for reducing a reaction time of the driver assistance system is adjusted to the behavior of the motorized transportation vehicle traveling immediately ahead of the motorized transportation vehicle. As a result of the driver assistance system being able to react more rapidly, a build-up or summation of reaction times is avoided. Various approaches are conceivable for detecting the presence of longitudinally guided platoon travel. For example, the data describing the relative movement of two preceding motorized transportation vehicles and the ego-motorized transportation vehicle may be evaluated. Furthermore, additional information about motorized transportation vehicles in the surroundings of the ego-transportation vehicle which have an active longitudinally guiding driver assistance system may be collected via car-to-car systems or car-to-X systems.

After identifying platoon travel, an accordion effect may be reduced by changing parameters of the automatic longitudinal guidance of the ego-transportation vehicle; however, in particular, in the case of longer platoons, modified parameters may again build up, so that in this case, the accordion effect may occur again. Furthermore, limits are set for minimizing delay times, time constants, and reaction times, in particular, when starting, since delays in the sensor domain are unavoidable due to evaluation and plausibility checks.

Disclosed embodiments provide a method for automatic control of a transportation vehicle when starting, which improves the following behavior of the transportation vehicles and thereby increases the transportation vehicle throughput, for example, at a junction, intersection, or traffic light. By increasing the transportation vehicle throughput, fuel consumption and pollutant emissions of the transportation vehicles may be reduced.

Disclosed embodiments provide a method for semi-automated or automatic control of a transportation vehicle when starting, a method for semi-automated or automatic control of a transportation vehicle, a device for activating semi-automated or automatic control of a transportation vehicle, and a device for activating semi-automated or automatic control of a transportation vehicle when starting.

According to the disclosed embodiments, a method is provided for semi-automated or automatic control of a transportation vehicle when starting. The semi-automated control of the transportation vehicle may, for example, comprise automatic longitudinal control of the transportation vehicle. By the automatic longitudinal control of the transportation vehicle, a starting operation of the transportation vehicle may be automatically initiated, the transportation vehicle may be automatically accelerated or decelerated, and/or the transportation vehicle may be automatically brought to a standstill. In addition, the automatic control may comprise lateral control of the transportation vehicle, in which a steering angle of the transportation vehicle is automatically set. According to the method, a driving intention message is received from another transportation vehicle. A driving intention message is a message including a piece of information about the planned starting or driving operation of the other transportation vehicle. The driving intention message may, for example, comprise a digital message containing information about a future planned starting and/or driving operation of the other transportation vehicle. Furthermore, according to the method, it is determined whether the additional transportation vehicle is directly in front of the transportation vehicle. In this context, directly in front of the transportation vehicle means, for example, that no other transportation vehicle is situated between the transportation vehicle and the other transportation vehicle. When the transportation vehicle and the additional transportation vehicle are stationary, a distance between the transportation vehicle and the additional transportation vehicle may be, for example, in the range of a few centimeters up to several meters, for example, up to 5 m. Depending on the driving intention message received by the other transportation vehicle, a parameter for the automatic control of the transportation vehicle is determined if it has been detected that the other transportation vehicle is situated directly in front of the transportation vehicle. In other words, the parameter for the automatic control of the transportation vehicle is determined only as a function of a driving intention message which originates from a transportation vehicle traveling directly ahead. As the intended driving behavior of the transportation vehicle traveling ahead is known, the starting behavior of the transportation vehicle may be optimally adjusted set to the transportation vehicle traveling directly ahead, and control delays may be avoided. As a result, a build-up of delays may be reduced, and an accordion effect may be avoided.

The reception of the driving intention message may comprise data transmission by vehicle-to-vehicle communication between the transportation vehicle and the other transportation vehicle. The vehicle-to-vehicle communication is also referred to as car-to-car communication (C2C) or vehicle-to-vehicle communication (V2V). The vehicle-to-vehicle communication may be present in the transportation vehicle for various tasks, for example, driver assistance systems, and may provide rapid, real-time data transmission. As a result, instantaneous driving intention messages of other transportation vehicles are available to the transportation vehicle without additional effort.

The driving intention message may comprise various information which may be evaluated by the transportation vehicle for controlling starting. According to at least one disclosed embodiment, the driving intention message comprises a piece of position information about an instantaneous position of the other transportation vehicle. The instantaneous position of the other transportation vehicle thus indicates the starting position for a future starting operation. Furthermore, the instantaneous position of the other transportation vehicle may be used to determine whether the other transportation vehicle is situated directly in front of the transportation vehicle, based on the instantaneous position of the ego-transportation vehicle. Alternatively or in addition, the driving intention message comprises a planned start time for starting a drive engine of the other transportation vehicle. This makes it possible for the transportation vehicle to start its own drive engine in a timely manner, but still to leave it deactivated for as long as possible. As a result, transportation vehicle wear and fuel consumption may be reduced.

Alternatively or in addition, the driving intention message comprises a planned acceleration profile, a planned speed profile, and/or a planned position profile of the other transportation vehicle. The position profile may, for example, comprise a series of displacement-time points. Based on one or several of these pieces of information, the transportation vehicle may, for example, determine and implement its own starting profile, taking into account its own driving performance. Since the planning of the starting operation of the ego-transportation vehicle may be carried out in advance, i.e., chronologically before the departure of the transportation vehicle, delay times due to control processes may be avoided, and an accordion effect may thus be reduced or avoided.

Alternatively or in addition, the driving intention message comprises a planned start time of the other transportation vehicle. As a result, it is possible for the transportation vehicle to determine a start time for its own starting profile and to make preparations in a timely manner. The preparations relate, for example, to releasing a brake of the transportation vehicle, developing sufficient torque in the transportation vehicle engine, and/or preparing a clutch of the transportation vehicle for the starting operation. Furthermore, the planned start time may be displayed to a driver of the transportation vehicle, so that the driver is not surprised by a sudden, unexpected behavior of the transportation vehicle.

The parameter for the automatic control of the transportation vehicle may, for example, relate to a distance to be maintained between the transportation vehicle and the other transportation vehicle. In particular, for example, during a starting operation, the distance between the transportation vehicle and the other transportation vehicle may be kept relatively small, taking into account legally prescribed minimum distances, without this being deemed to be uncomfortable by a driver of the transportation vehicle. As a result, the transportation vehicle may follow the other transportation vehicle rapidly. Furthermore, the distance between the transportation vehicle and the other transportation vehicle may be increased in a timely manner if it is apparent from the driving intention message of the other transportation vehicle that the acceleration of the other transportation vehicle is at least briefly suspended, for example, due to shifting of gears. By increasing the distance to be maintained in a timely manner, a uniform acceleration may be set in the ego-transportation vehicle, so that an accordion effect may be reduced, and due to the small distance, a large number of transportation vehicles may pass through, for example, an intersection or a traffic light.

Alternatively or in addition, the parameter for the automatic control of the transportation vehicle comprises a planned start time for starting a drive engine of the transportation vehicle. Based, for example, on a planned start time of the other transportation vehicle which was transmitted via the driving intention message, the transportation vehicle may select a convenient start time for starting the drive engine, taking into account a typical time to start the drive engine. As a result, it may be ensured that the transportation vehicle is ready for operation in a timely manner, to avoid an accordion effect when starting in a platoon. Nonetheless, the drive engine may thus be started at a latest possible point in time, to reduce the transportation vehicle's fuel consumption and emissions.

Alternatively or in addition, the parameter for the automatic control of the transportation vehicle comprises a planned acceleration profile of the transportation vehicle, a planned speed profile of the transportation vehicle, and/or a planned position profile of the transportation vehicle. In other words, a trajectory of the transportation vehicle is planned, and the automatic control is set according to the planned trajectory. In this case, characteristics of the transportation vehicle, for example, loading of the transportation vehicle or performance of the transportation vehicle drive, and shifting points for changing gears, may be taken into account. Furthermore, the parameter for the automatic control of the transportation vehicle may comprise a planned start time of the transportation vehicle. The automatic control may use the planned start time, for example, to make preparations for starting the transportation vehicle, for example, to engage a gear in a transmission of the transportation vehicle and/or to reduce braking pressure of a braking system of the transportation vehicle.

To determine whether the other transportation vehicle is situated directly in front of the transportation vehicle, in at least one disclosed embodiment of the method, a piece of traffic lane information is determined which indicates an occupancy of the traffic lane in front of the transportation vehicle. The piece of traffic lane information may be detected, for example, via optical detection methods, for example, a front camera. For example, a transportation vehicle identification tag, for example, the transportation vehicle license plate, may be transmitted in the driving intention message. Using the piece of traffic lane information, the transportation vehicle license plate may be compared to a transportation vehicle license plate of a transportation vehicle in front of the transportation vehicle, and it may thus be determined whether the other transportation vehicle is situated directly in front of the transportation vehicle. Alternatively or in addition, an instantaneous position of the transportation vehicle may be compared to an instantaneous position of the other transportation vehicle, to determine whether the other transportation vehicle is situated directly in front of the transportation vehicle. The instantaneous position of the transportation vehicle may, for example, be ascertained via a global positioning system (GPS). The instantaneous position of the other transportation vehicle may, for example, be transmitted from the other transportation vehicle to the transportation vehicle via the driving intention message.

To enable rapid starting for following transportation vehicles without an accordion effect, in an additional disclosed embodiment, the method furthermore comprises generating an additional driving intention message as a function of the parameter for the automatic control. The additional driving intention message indicates a piece of information about a planned starting operation of the transportation vehicle, and is transmitted via vehicle-to-vehicle communication. In other words, the transportation vehicle, which, as previously described, has determined the parameters for the automatic control based on driving intentions of a transportation vehicle traveling ahead, may thereby ascertain its own starting operation, and transmit it in an additional driving intention message, for example, for a following transportation vehicle. Thus, multiple transportation vehicles which use the previously described method may adjust their respective planned starting operation to the planned starting operation of the leading transportation vehicle. Since all the planning of the starting processes can take place in advance, before the actual start, control delays may be avoided, and an accordion effect when starting may thus be reduced. As a result, for example, when starting at a traffic light during a green phase, many transportation vehicles may pass rapidly through the traffic light. Since the planned starting processes are transmitted in advance from transportation vehicle to transportation vehicle, only simple communications structures are required from the transportation vehicle to the leading transportation vehicle and/or the following transportation vehicle. In addition, no bidirectional communication is required between transportation vehicles; rather, it is sufficient if a respective transportation vehicle transmits its planned starting operation as a so-called broadcast message via a corresponding driving intention message. As a result, the required information exchange may be ensured in a simple manner.

In another disclosed embodiment, the method furthermore comprises receiving a traffic light message from a traffic light system, and determining the parameter for the automatic control of the transportation vehicle as a function of the traffic light message received by the traffic light system. The traffic light message comprises a piece of time information about a traffic light phase of the traffic light system, and alternatively or in addition, a piece of location information about a location of the traffic light system or a topology of an intersection (for example, the course and the number of traffic lanes). The piece of time information about the traffic light phase may, for example, comprise a start and end time of a green phase of the traffic light system. As previously described, the transportation vehicle is situated, for example, in a line of transportation vehicles, and approaches the traffic light system. Based on the time information about the traffic light phase of the traffic light system, the piece of information about the location of the traffic light system and optionally about the topology of the intersection, as well as the automatic control planned for the transportation vehicle, the transportation vehicle may determine whether the transportation vehicle will be able to pass through the traffic light system during the next green phase. If it is possible to pass through the traffic light system during the next green phase, the transportation vehicle follows its leading transportation vehicle using the parameters for the automatic control, as they were previously determined, taking into account the planned starting operation of the leading transportation vehicle.

In the case that it is likely that the transportation vehicle will not pass through the traffic light system during the next green phase, the parameters for the automatic control may be determined in such a way that the transportation vehicle comes to a stop in the platoon, in front of the traffic light system, in the most energy-efficient manner.

According to the disclosed embodiments, an additional method is provided for semi-automated or automatic control of a transportation vehicle when starting. The method comprises detecting a piece of information on the surroundings in front of the transportation vehicle, and determining a parameter for the automatic control of the transportation vehicles when starting, as a function of the detected piece of information on the surroundings. Furthermore, according to the method, a driving intention message is generated as a function of the parameter for the automatic control. The driving intention message indicates a piece of information about the planned starting operation of the transportation vehicle. The driving intention message is transmitted via vehicle-to-vehicle communication. This method is applicable, for example, in situations in which the transportation vehicle is situated at the head of a transportation vehicle platoon, or travels behind a transportation vehicle which does not send out driving intention messages. The transportation vehicle therefore parameterizes its automatic control, in particular, its longitudinal control, based on the detected piece of information on the surroundings in front of the transportation vehicle. To avoid an accordion effect with following transportation vehicles, the transportation vehicle generates a driving intention message indicating its planned starting operation, and transmits this driving intention message, so that it may be received by other transportation vehicles. For its part, a following transportation vehicle may set its parameters for the automatic control of the transportation vehicle as a function of the driving intention message received by the transportation vehicle. As a result, an accordion effect on the following transportation vehicles may be effectively reduced, whereby fuel consumption of the following transportation vehicles may be reduced, and an overall throughput of transportation vehicles, for example, at a traffic light, may be increased.

In at least one disclosed embodiment, the detection of the piece of information on the surroundings comprises receiving a traffic light message from a traffic light system. The parameter for the automatic control of the transportation vehicle is determined as a function of the traffic light message received by the traffic light system. The traffic light message may, for example, indicate when a green phase begins. The transportation vehicle may use this piece of information to parameterize a starting operation and to transmit a resulting planned starting operation to a following transportation vehicle with the aid of a driving intention message. As a result, delays when starting at a traffic light system may be avoided.

In an additional disclosed embodiment, the detection of the piece of information on the surroundings comprises detecting a traffic situation in front of the transportation vehicle. The parameter for the automatic control of the transportation vehicle is determined as a function of the detected traffic situation. The traffic situation may, for example, comprise an intersection, an on-ramp, a restricted railroad crossing, or a traffic light system. The piece of information on the surroundings may, for example, be detected with the aid of a camera of the transportation vehicle. Alternatively or in addition, the piece of information on the surroundings may be detected via messages which are transmitted via infrastructure-to-vehicle communication. From the detected piece of information on the surroundings, the transportation vehicle may determine a starting operation and parameterize the automatic control according to the planned starting operation. The planned starting operation may furthermore be transmitted to a following transportation vehicle via the previously described driving intention message. The following transportation vehicle may adjust its starting operation to the starting operation of the transportation vehicle, thereby making it possible for an accordion effect to be reduced when starting.

According to the disclosed embodiments, furthermore, a device for activating semi-automated or automatic control of a transportation vehicle when starting is provided. The device comprises an input for receiving a driving intention message from another transportation vehicle. The driving intention message indicates a piece of information about a planned starting operation of another transportation vehicle. The device furthermore comprises a processing device which is capable of carrying out the following. Initially, the processing device determines whether the other transportation vehicle is situated directly in front of the transportation vehicle. As a function of the driving intention message received by the other transportation vehicle, the processing device determines a parameter for the semi-automated/automatic control of the transportation vehicle. If the processing device has determined that the other transportation vehicle is situated directly in front of the transportation vehicle, it activates the semi-automated/automatic control of the transportation vehicle via the parameter. The parameter may, for example, comprise an acceleration, a distance to be maintained from the transportation vehicle traveling ahead, displacement-time-points, and/or a trajectory. The device is therefore suitable for carrying out the previously described method or one of its disclosed embodiments, and therefore also comprises the aforementioned benefits.

According to the disclosed embodiments, furthermore, a method for activating semi-automated/automatic control of a transportation vehicle when starting is provided, which comprises a detection device and a processing device. The detection device is used for detecting a piece of information on the surroundings in front of the transportation vehicle. The processing device is capable of determining a parameter for the semi-automated/automatic control of the transportation vehicle when starting, as a function of the detected piece of information on the surroundings. Furthermore, the processing device is capable of generating a driving intention message. The driving intention message indicates a piece of information about the planned starting operation of the transportation vehicle. Finally, the processing device is capable of transmitting the driving intention message via vehicle-to-vehicle communication. The device is thus suitable for carrying out the previously described method, and therefore also comprises the benefits with respect to the previously described method.

Finally, according to the disclosed embodiments, a transportation vehicle is provided which comprises a control device for semi-automated or automatic control of the transportation vehicle, and a vehicle-to-vehicle communication device for transmitting data to another transportation vehicle and/or receiving data from the other transportation vehicle. The control device may, for example, comprise automatic longitudinal control of the transportation vehicle. Furthermore, the transportation vehicle comprises one of the previously described devices for activating the semi-automated/automatic control of the transportation vehicle when starting. This device for activating the semi-automated/automatic control when starting is linked to the control device and the vehicle-to-vehicle communication device. When starting, the transportation vehicle is therefore capable of adjusting its own starting operation to a planned starting operation of a transportation vehicle traveling ahead, and in addition, transmitting its own planned starting operation to a following transportation vehicle. If the transportation vehicle is traveling in a platoon, it may therefore start in semi-automated or automatic manner in such a way that an accordion effect in the platoon is avoided.

A structure of a transportation vehicle having longitudinal control will be initially described below by way of example, in connection with FIG. 1. The functioning of the longitudinal control will then be described in detail for various scenarios shown in FIGS. 2 to 4, in connection with FIG. 5, based on various examples.

FIG. 1 shows a transportation vehicle 10 including a control device 11. The control device 11 is, for example, a device for automatic longitudinal control of the transportation vehicle 10. The control device 11 may, for example, set the speed of the transportation vehicle 10 by controlling a drive engine (not shown) and a braking system (not shown) of the transportation vehicle 10. The control device 11 may, for example, take into account a distance from a transportation vehicle traveling ahead and a set desired speed. Such control devices 11 are, for example, referred to as adaptive cruise control (ACC) systems. The control device 11 may, for example, be linked to sensors of the transportation vehicle to determine a distance from a transportation vehicle traveling ahead. Furthermore, the control device 11 may, for example, be linked to a camera 12 of the transportation vehicle to take in account an image of surroundings in front of the transportation vehicle 10 during the longitudinal control of the transportation vehicle 10. The control device 11 may further provide or support automatic lateral control of the transportation vehicle, so that the transportation vehicle may be operated in a fully automatic manner.

The transportation vehicle 10 furthermore comprises a device 13 for activating the automatic control device 11 of the transportation vehicle 10 when starting. The device 13 comprises an input 14 for receiving a driving intention message from another transportation vehicle via a vehicle-to-vehicle communication device 16. The driving intention message indicates a piece of information about a planned starting operation of the other transportation vehicle. The device 13 furthermore comprises a processing device 15, for example, a microprocessor controller. The device 13 may furthermore comprise a detection device for detecting a piece of information on the surroundings in front of the transportation vehicle, for example, the camera 12.

Figure 2:
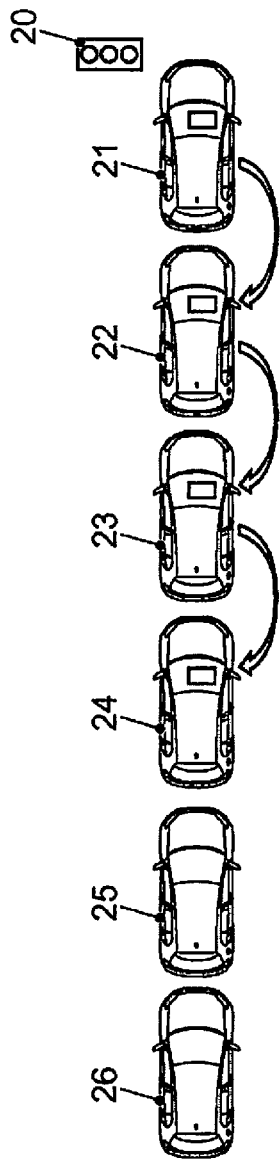
FIG. 2 shows a first scenario of transportation vehicle platoons including transportation vehicles according to a disclosed embodiment.
Figure 3:
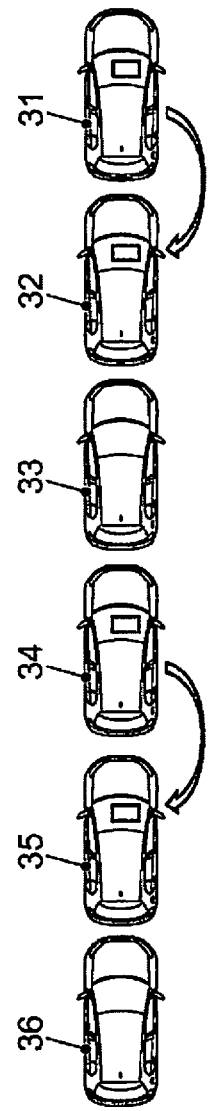
FIG. 3 shows a second scenario of transportation vehicle platoons including transportation vehicles according to a disclosed embodiment.
Figure 4:
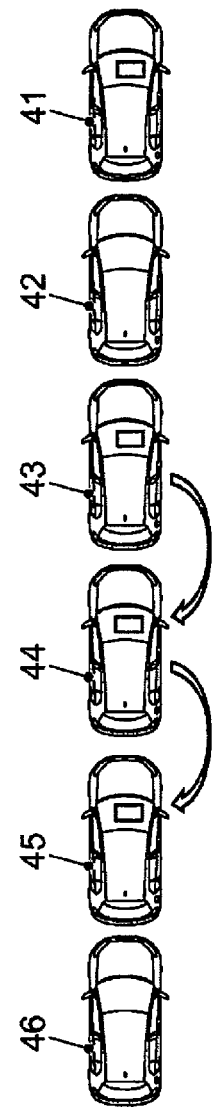
FIG. 4 show a third scenario of transportation vehicle platoons including transportation vehicles according to a disclosed embodiment.

The functioning of the device 13 will be described in detail below for various scenarios which are depicted in FIGS. 2 to 4, with reference to a method depicted in FIG. 5. Although the device 13, the control device 11, and the communication device 16 are depicted in FIG. 1 as separate devices, it is obvious that these devices may also be configured to be integrated or may be configured as further divided sub-devices.

The technical basis of the method described below is communication between transportation vehicles and possibly also with a roadside infrastructure. Such communication is also referred to as V2X technology.

Communication between transportation vehicles is known in another context, for example, from DE 10 2008 036 131 A1. DE 10 2008 036 131 A1 relates to a method for detecting a traffic situation in the transportation vehicle surroundings, to improve an automatic distance regulation system. To ascertain the traffic situation in the surroundings of the ego-transportation vehicle, driving dynamics data of the other road users are ascertained, for example, their position and their speed and direction. These data may be transmitted from transportation vehicle to transportation vehicle in very brief radiotelegrams by wireless vehicle-to-vehicle communication. From the driving dynamics data of transportation vehicles traveling ahead, for example, a transportation vehicle platoon may be detected, and its average platoon speed may be ascertained. This average platoon speed may be communicated to the driver. If the driver maintains this average speed and does not accelerate as the platoon speeds up, stop-and-go driving may be avoided in the case of high traffic density.

In addition, in another context, communication between an infrastructure device, for example, a traffic light, and a transportation vehicle, is known from DE 10 2010 013 647 B4. DE 10 2010 013 647 B4 relates to a method for controlling multiple transportation vehicles to operate the multiple transportation vehicles in a platoon. From the multiple transportation vehicles, one transportation vehicle is selected as the lead transportation vehicle. This lead transportation vehicle monitors a respective actual position of each of the multiple transportation vehicles via vehicle-vehicle communication, based on data from a respective global positioning device in each of the multiple transportation vehicles. Based on the actual position of each of the multiple transportation vehicles, a respective minimal desirable distance between the transportation vehicles is determined. Based on the actual position of each of the transportation vehicles, furthermore, a maximum fuel-efficient distance is determined for each of the multiple transportation vehicles. Based on the distances between the transportation vehicles thus determined, a respective commanded transportation vehicle position is chosen for each transportation vehicle and is transmitted to the respective transportation vehicle, and the respective transportation vehicle is operated based on the respective commanded transportation vehicle position. In connection with information from infrastructure devices (for example, traffic lights), it may be made possible for the entire platoon to pass through the traffic light during the next green phase without breaking up the platoon.

In the case of the disclosed embodiments, messages about the driving intention of the transportation vehicles are transmitted via the communication between the transportation vehicles. The driving intention may, for example, be specified by a trajectory described via displacement-time points. The driving intention thus specifies future states of motion or stopping locations of a transportation vehicle. As a function of the driving intention of a transportation vehicle traveling ahead, automated longitudinal control and possibly also lateral control of the transportation vehicle are carried out. In particular, the starting and following behavior is parameterized as a function of the situation and taking into account the driving intention of the leading transportation vehicle.

In real traffic surroundings, suitable transportation vehicles will be present for carrying out the method described below, as well as other transportation vehicles which are not equipped with the corresponding technology and are therefore not capable of carrying out the method described below. The transportation vehicles will therefore be referred to below as "transportation vehicles equipped with platoon starting technology" or as "transportation vehicles not equipped with platoon starting technology".

At least the transportation vehicles equipped with platoon starting technology may also receive information about infrastructure objects, for example, information about the phases of a traffic light, a so-called traffic light system (TLS), or a topology of an intersection. The information about the traffic light phases comprises, for example, an instantaneous signal state, planned next switching times, a phase length, or a piece of information which describes the overall signal phase time behavior, for example, signal phase and timing (SPAT). The information about the topology of the intersection may, for example, comprise the course and/or the number of traffic lanes (for example, MAP). The transportation vehicles may, for example, receive the traffic light phase information from the traffic light controller locally, directly via a roadside station of an intelligent traffic system (for example, intelligent transportation system roadside station), optionally by radio or from a central server via, for example, a mobile radio link. Alternatively or in addition, the traffic light phase information may be derived from flow data of transportation vehicles (so-called floating car data) or flow data from mobile radio devices (so-called floating probe data) with the aid of a server, and transmitted to the transportation vehicles, for example, via a mobile radio link. For this purpose, furthermore, the transportation vehicle's own cameras or cameras of mobile radio devices may be used for updating and synchronizing these data.

As previously described, in practice, it will occur that some transportation vehicles waiting for the green phase in a line of transportation vehicles in front of a traffic light are not equipped with the platoon starting technology. Transportation vehicles with and without platoon starting technology may be mixed arbitrarily within a line of transportation vehicles. In FIGS. 2 to 4, three different scenarios of transportation vehicles in a line of transportation vehicles are depicted. Within the scope of this description, it is defined that not all transportation vehicles which are in a line of transportation vehicles in front of a traffic light form a platoon, but rather, only those transportation vehicles which are directly behind one another, and in which the leading transportation vehicle transmits at least driving intention messages and the following transportation vehicle processes them for the platoon start. A platoon may be made up of two or more transportation vehicles. As soon as a transportation vehicle which does not send driving intention messages is in the line of transportation vehicles, the platoon ends. A new platoon in the line of transportation vehicles is created via two or more consecutive transportation vehicles which transmit and/or process driving intention messages corresponding to the aforementioned definition.

It is to be differentiated whether the first transportation vehicle in a platoon is also the first transportation vehicle in the line of transportation vehicles and, for example, is at a traffic light stop line, or whether it has a transportation vehicle as the leading transportation vehicle which is not equipped with platoon starting technology. Correspondingly, transportation vehicle roles within the line of transportation vehicles or the transportation vehicle platoon will be defined below.

The first transportation vehicle role which a transportation vehicle may assume is that of the traffic light starting transportation vehicle (referred to below as the TLS starting transportation vehicle). The TLS starting transportation vehicle is equipped with the platoon starting technology, transmits driving intention messages, and is the first transportation vehicle at the stop line in front of a TLS. If a transportation vehicle which does not transmit driving intention messages is at the stop line, there is no TLS starting transportation vehicle in the line of transportation vehicles.

Another transportation vehicle role is the inner starting transportation vehicle. The inner starting transportation vehicle is a transportation vehicle which equipped with the platoon starting technology, transmits its own driving intention messages, and is behind a transportation vehicle which does not transmit driving intention messages. Thus, for example, it is behind a transportation vehicle without platoon starting technology. It is in front of a following transportation vehicle with is described below, and is not the first transportation vehicle at the stop line of a traffic light.

Another transportation vehicle role is the following transportation vehicle. The following transportation vehicle is a transportation vehicle which is equipped with the platoon starting technology, processes the driving intention messages of its leading transportation vehicle, transmits driving intention messages itself, and adjusts its starting operation according to the driving intention messages of the leading transportation vehicle. It is either behind a TLS starting transportation vehicle or behind an inner starting transportation vehicle or behind another following transportation vehicle.

All remaining transportation vehicles are transportation vehicles which are not equipped with platoon starting technology. These transportation vehicles do not transmit driving intention messages and do not adjust their starting operation to driving intention messages of the leading transportation vehicle. Transportation vehicles not equipped with platoon starting technology may be in any position in the line of transportation vehicles.

FIGS. 2 to 4 show three scenarios of transportation vehicle lines.

In FIG. 2, a line of transportation vehicles is at a traffic light or traffic light system (TLS) 20. The line of transportation vehicles comprises transportation vehicles 21 to 26. The transportation vehicle 21 is the TLS starting transportation vehicle, the transportation vehicles 22 to 24 are following transportation vehicles, and the transportation vehicles 25 and 26 are transportation vehicles which are not equipped with platoon starting technology. The transportation vehicles 21 to 24 thus form a platoon of transportation vehicles which is suitable for a platoon start in the sense of the present description.

FIG. 3 shows another scenario of a line of transportation vehicles including transportation vehicles 31 to 36. The transportation vehicles 31, 32, 34, and 35 are equipped with the platoon starting technology, and the transportation vehicles 33 and 36 are not equipped with the platoon starting technology. The transportation vehicles 31 and 32 thus form a first platoon, and the transportation vehicles 34 and 35 form a second platoon. The transportation vehicle 31 is the TLS starting transportation vehicle of the first platoon, and the transportation vehicle 32 is a following transportation vehicle in the first platoon. The transportation vehicle 34 is the inner starting transportation vehicle in the second platoon, and the transportation vehicle 35 is a following transportation vehicle in the second platoon.

FIG. 4 shows still another scenario of a line of transportation vehicles including transportation vehicles 41 to 46. The transportation vehicles 41, 43, 44, and 45 are equipped with the platoon starting technology, and the transportation vehicles 42 and 46 are not equipped with the platoon starting technology. Although the transportation vehicle 41 is a TLS starting transportation vehicle, it has no following transportation vehicle and is thus not part of a transportation vehicle platoon, but rather is a single transportation vehicle. The transportation vehicle 43 is an inner starting transportation vehicle of a platoon which furthermore comprises the transportation vehicles 44 and 45 as following transportation vehicles.

The functional sequence of the platoon start of a transportation vehicle which is equipped with the platoon starting technology will be described below in a simplified manner in connection with FIG. 5. Details for the transportation vehicles in the various transportation vehicle roles of FIGS. 2 to 4 will subsequently be described in detail.

Figure 5:
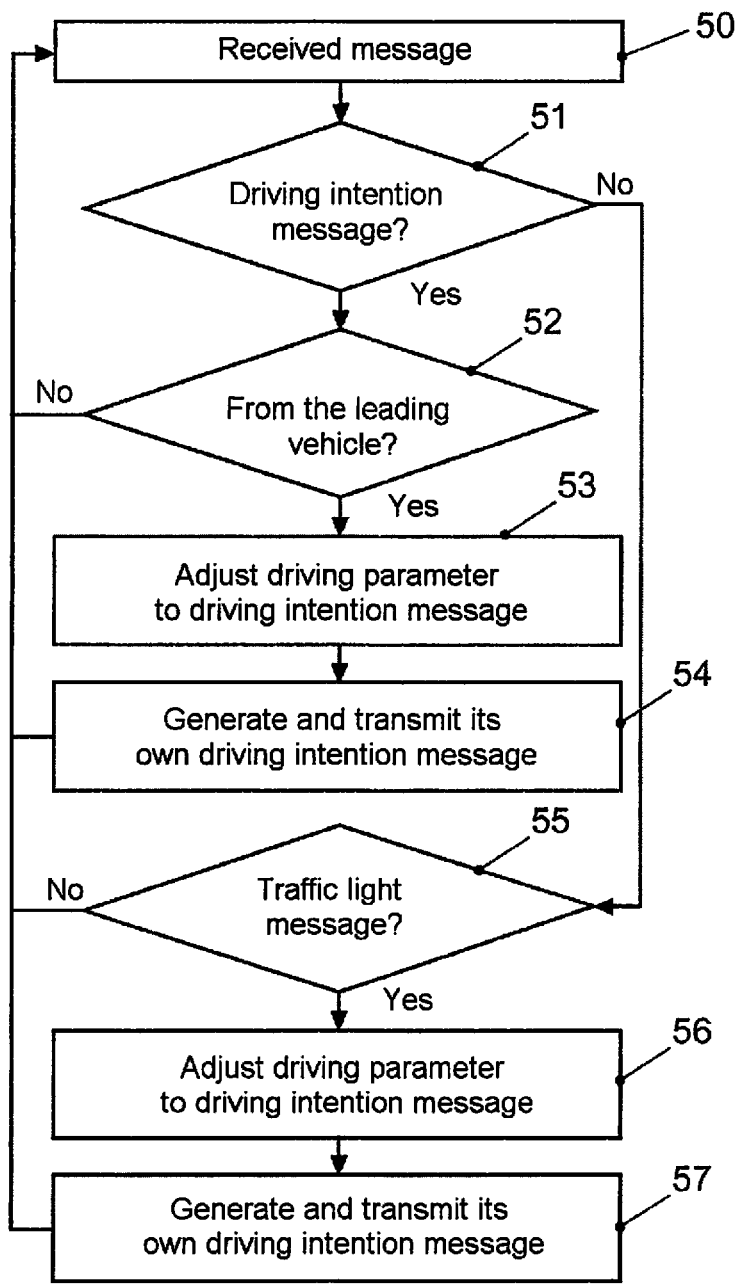
FIG. 5 shows operations of a disclosed method.

According to the method shown in FIG. 5, in operation at 50, a message is received via the communication device 16. The message may, for example, be a driving intention message. This is checked in operation at 51. If the message is a driving intention message, in operation at 52, it is checked whether the driving intention message was transmitted by the leading transportation vehicle. For example, in FIG. 2, the transportation vehicle 22 may receive a driving intention message from the transportation vehicle 21. If the driving intention message was received from the leading transportation vehicle, in operation at 53, the driving parameters are adjusted to the driving intention message. In the above example, the transportation vehicle 22 may adjust its starting parameters to the driving intention message of the transportation vehicle 21. The driving intention message may, for example, comprise displacement-time points of a trajectory of the transportation vehicle 21 when starting. In operations at 54, another driving intention message is generated and transmitted by the transportation vehicle, as a function of the adjusted parameters for the starting operation. In the above example, the transportation vehicle 22 may generate a driving intention message and transmit it, so that the transportation vehicle 23 is able to receive this driving intention message and is able to adjust its driving parameters in a corresponding manner when starting. The method is then continued in operation at 50.

If it is determined in operation at 51 that the received message is not a driving intention message, in operation at 55, it is checked whether the message is a traffic light message from, for example, the traffic light system 20 shown in FIG. 2. If the message is a traffic light message, the receiving transportation vehicle may adjust its driving parameters to information from the traffic light message in operation at 56. This is of interest to the transportation vehicle 21, since this transportation vehicle is able to determine precisely, for example, the start time for its starting trajectory, based on the traffic light message. However, a traffic light message may also contain useful information for other transportation vehicles, for example, the following transportation vehicles 22 to 24. For example, the transportation vehicles may estimate when an engine of the respective transportation vehicle is to start or whether it is still worthwhile to switch off the engine of the respective transportation vehicle. In operation at 57, a driving intention message is generated and transmitted, based on the adjusted driving parameters. The TLS starting transportation vehicle, for example, the transportation vehicle 21 of FIG. 2, may already determine a starting trajectory based on the traffic light message, and transmit it to the following transportation vehicle 22 via the driving intention message.

The functional sequence of the platoon start which was previously described in an overview will be described in greater detail for the various situations and scenarios, and for the transportation vehicle roles. The purpose of the platoon start functionality is that a following transportation vehicle follows its leading transportation vehicle after it starts, thereby minimizing an accordion effect. For this purpose, the driving intention messages of the leading transportation vehicle are processed by a control system of the automated longitudinal control of the following transportation vehicle.

The control may, for example, occur at displacement-time points of the trajectory of the leading transportation vehicle, and may take other input values into account, for example, status and event messages of its leading transportation vehicles, information from a front sensor system of the transportation vehicle, and phase information of the traffic light system 20.

An acceleration of the following transportation vehicle may, for example, have a maximum value which is chosen to be as high as the acceleration of the transportation vehicle traveling ahead. However, linking the accelerations between the transportation vehicles is not necessary. Thus, for example, a transportation vehicle traveling ahead may start having a higher acceleration than the following transportation vehicle, for example, because the following transportation vehicle is not technically capable of doing so. The transportation vehicle traveling ahead may thus choose its acceleration independently of the following transportation vehicle. Likewise, the following transportation vehicle may freely choose its acceleration, for example, the same acceleration as the leading transportation vehicle. The longitudinal control of the transportation vehicles may, for example, take energy efficiency criteria into account, and may therefore adjust the accelerations to one another within technical limits.

Furthermore, a following transportation vehicle may estimate whether it will be likely to be able to pass through the stop line during the next green phase, taking into account the phase information of the traffic light system, its position with respect to a stop line of the traffic light system, and the driving intention messages, as well as status and event messages of its leading transportation vehicles. If, for example, the leading transportation vehicle is able to pass through the stop line during the green phase, but the following transportation vehicle is not able to do so, then, for example, an energy-efficient approach to the stop line may take place, instead of a platoon start while avoiding the accordion effect.

For the TLS starting transportation vehicle 21 or 31, for example, the functionality described below is implemented by the device 13. As shown in FIGS. 2 and 3, the TLS starting transportation vehicle is at a stop line of a traffic light system 20. The TLS starting transportation vehicle 21, 31 receives, for example, a traffic light message directly from the traffic light system 20. Alternatively or in addition, the TLS starting transportation vehicle 21, 31 may receive a traffic light message indirectly from a server via, for example, a mobile radio link. The traffic light message comprises phase information about the traffic light phases of the traffic light system 20. The TLS starting transportation vehicle 21, 31 plans its starting operation as a function of the phase information. In this case, for example, starting a switched-off drive engine may be planned with the aid of an automatic start-stop system. Furthermore, a point in time for engaging a gear, for actuating a clutch, and for controlling the drive engine may be planned. Based on this planning, for example, displacement-time points of the trajectory of the TLS starting transportation vehicle when starting may be determined and transmitted in a driving intention message. Thus, in the case of an engine which is switched off by an automatic start-stop system, starting the engine takes place in a manner which is automatically adjusted to the switching of the traffic light system. After the start of the green phase, the transportation vehicle starts automatically. It is clear that the automatic driving maneuvers are to be monitored by the driver of the transportation vehicle, depending on the level of automation.

An automatic start-stop system is disclosed in another context in DE 10 2008 042 306 A1. In the case of a method for an automatic start-stop system for an engine, in DE 10 2008 042 306 A1, external information about a traffic situation is used by a control unit of the transportation vehicle as output data for implementing the automatic start-stop system. The external information about the traffic situation is provided by another device. The other device may, for example, be a traffic light system or traffic light. Alternatively or in addition, the other device may be another transportation vehicle. The disclosed embodiments enable the matching of the automatic start-stop system of the engine to infrastructure devices or other transportation vehicles. The communication between the transportation vehicle and the infrastructure device or the other transportation vehicles may, for example, be implemented via so-called car-to-infrastructure communication (C2I) or car-to-car communication (C2C). Thus, for example, it may be ascertained how long the ego-transportation vehicle must continue to wait at traffic lights, intersections, and junctions. In the case of longer waiting times, the engine may be switched off significantly earlier than in the case of conventional systems, thus saving fuel. Likewise, the engine may also be restarted in a timely manner before resuming the trip. Furthermore, in the case of a very brief stopping time, it is possible not to switch off the engine at all.

In the case that no traffic light message is available from the traffic light system 20, the transportation vehicle 21, 31 may itself detect the switchover of the traffic light system, for example, via the front camera 12. The transportation vehicle 21, 31 then accelerates automatically. The trajectory resulting due to the acceleration is transmitted via driving intention messages. If the transportation vehicle is itself not able to detect the switchover of the traffic light system, for example, due to a soiled camera or backlighting, the starting of the transportation vehicle is initiated by the driver. However, acceleration may be controlled by the control device 11, or may be ascertained, for example, from an accelerator pedal position, so that an expected trajectory of the transportation vehicle may be determined as displacement-time points, and may be transmitted via a driving intention message.

The inner starting transportation vehicle, for example, the transportation vehicle 34 in FIG. 3 or the transportation vehicle 43 in FIG. 4, is the first transportation vehicle in a starting platoon, but is not at the stop line of the traffic light system 20, but rather is behind a transportation vehicle which is not equipped with the platoon starting technology. With the aid of a front sensor system, for example, the front camera 12, the inner starting transportation vehicle accelerates in a manner which is automatically adjusted to the leading transportation vehicle. Thus, it accelerates in a manner which is adjusted to the transportation vehicle 33 or 42, as soon as the transportation vehicle accelerates. As soon as the inner starting transportation vehicle has ascertained that its leading transportation vehicle has started, its own starting operation is planned and is transmitted via driving intention messages. Following transportation vehicles, for example, the transportation vehicles 35 and 44, may plan their corresponding starting operation based on the driving intention messages.

If no phase information about the traffic light system 20 is available, the inner starting transportation vehicle 34, 43 may, for example, observe the traffic light system 20 with the aid of a front sensor system (for example, a front camera 12), to detect a phase change to yellow or red, and to stop the transportation vehicle in a timely manner. Alternatively, the driver may monitor the driving maneuver and bring the transportation vehicle to a stop at a red light at the end of the green phase.

If the inner starting transportation vehicle 34, 43 receives phase information from the traffic light system 20 directly or indirectly via a server, the inner starting transportation vehicle 34, 43 may use this phase information for controlling the starting operation as follows. In the case of a drive engine which is switched off due to an automatic start-stop system, the engine starts in a manner which is automatically adjusted to the switching of the traffic light system. In this case, the position of the transportation vehicle relative to the stop line of the traffic light system may optionally be taken into account. Furthermore, it may be estimated when the leading transportation vehicle will start driving. Optionally, for this purpose, available driving intention messages from transportation vehicles which are farther ahead may be used, for example, from the transportation vehicle 32 or 41 in FIG. 3 or 4. Thus, the start time of the engine may be chosen in an energy-efficient manner. The inner starting transportation vehicle 34, 43 estimates whether it will likely be able to pass through the stop line during the green phase, taking into account the phase information of the traffic light system, its position with respect to the stop line of the traffic light system, and prognosticated driving behavior of the leading transportation vehicle, as well as the measured values of the front sensor system and available driving intention messages from transportation vehicles traveling farther ahead. If it is determined that the leading transportation vehicle and the inner starting transportation vehicle will likely be able to pass through the stop line during the green phase, following travel takes place. If it is estimated that the leading transportation vehicle and the inner starting transportation vehicle are not able to pass through stop line during the green phase, energy-efficient following travel takes place. However, if it is estimated that the leading transportation vehicle is able to pass through the stop line during the green phase, and the inner starting transportation vehicle is not able to, no following travel takes place. Instead, an energy-efficient approach to the stop line takes place.

For the following transportation vehicle, for example, the transportation vehicles 22 to 24 of FIG. 2, the transportation vehicles 32 and 35 of FIG. 3, and the transportation vehicles 44, 45 of FIG. 4, the device 13 implements the platoon starting function described below. The following transportation vehicle is behind a TLS starting transportation vehicle 21, 23, or behind an inner starting transportation vehicle 34, 43, or behind a following transportation vehicle 22, 23 situated in front of it. It receives the driving intention messages of the respective leading transportation vehicle. In the case of an engine which is switched off due to an automatic start-stop system, the engine starts in a manner which is automatically adjusted to the driving intention message of the leading transportation vehicle. It follows its leading transportation vehicle in an automated manner, after the transportation vehicle has started to accelerate. Its own trajectory is determined based on the trajectory received from the leading transportation vehicle, and is transmitted to following transportation vehicles via driving intention messages.

If the following transportation vehicle receives phase information from the traffic light system 20, it estimates whether it is likely to be able to pass through the stop line during the green phase, taking into account this phase information, its own position with respect to the stop line of the traffic light system, and the prognosticated driving behavior of the leading transportation vehicles. If the leading transportation vehicle and the following transportation vehicle are likely to be able to pass through the stop line during the green phase, following travel takes place. If the leading transportation vehicle and the following transportation vehicle are not likely to be able to pass through the stop line during the green phase, energy-efficient following travel takes place. In this case, the distance from the leading transportation vehicle may also be increased for reasons of energy efficiency. If the leading transportation vehicle is likely to be able to pass through the stop line, and the following transportation vehicle is not likely to be able to pass through the stop line, following travel does not take place; instead, an energy-efficient approach to the stop line takes place.

If no phase information about the traffic light system is available to the following transportation vehicle, a prognosis of whether the following transportation vehicle is likely to be able to pass through the stop line during the green phase is not readily possible is a reliable manner. The transportation vehicle follows the leading transportation vehicle, taking into account the trajectory of the leading transportation vehicle transmitted by the driving intention messages, and is brought to a stop via an intervention by the driver or via, for example, optical detection of the switchover of the traffic light system to yellow or red.

Considered together, the platoon travel of the transportation vehicles 21 to 24 of FIG. 2 proceeds, for example, as follows. The traffic light system 20 transmits phase information which can be received by all transportation vehicles 21 to 26. The TLS starting transportation vehicle 21 uses this information to plan a starting operation. The following transportation vehicles 22 to 24 can use the information to, for example, determine the starting of their drive engines. The roles of the individual transportation vehicles result from the respective positions with respect to the traffic light system, as well as their surroundings information, i.e., whether or not the transportation vehicle detects a transportation vehicle traveling ahead. The switchover time of the traffic light system 20 to green is the start time for the starting operation of the platoon. The TLS starting transportation vehicle 21 uses this start time as the start time for its starting operation. A planned trajectory of the TLS starting transportation vehicle is transmitted to the following transportation vehicle 22 via one or multiple driving intention messages, as depicted in FIG. 2 by the arrow. The following transportation vehicle 22 processes the driving intention messages of the TLS starting transportation vehicle and transmits its own driving intention messages having its adjusted starting parameters to the following transportation vehicle 23, as indicated by the arrow in FIG. 2. The following transportation vehicle 23 processes the driving intention messages from the transportation vehicle 22 and transmits driving intention messages including its adjusted starting parameters. The following transportation vehicle 24 processes the message from the transportation vehicle 23 and transmits driving intention messages including its adjusted starting parameters. This may be continued arbitrarily in the case of longer platoons. In the following transportation vehicles, the received driving intention messages may be filtered and plausibility checked with respect to their relevance. In this case, for example, traffic lane data, a position of the transportation vehicle with respect to the stop line of the traffic light system, and information from the transportation vehicle's own sensor system may be used. A plausibility check of the received driving intention messages may, for example, be carried out via switching times of the traffic light system or measurements of distance from the leading transportation vehicle. In the case of implausible measurement data, the automatic start is terminated or delayed until new data are received. The determination of the position within the platoon, i.e., a determination of the transportation vehicle's own role, may also be carried out again. In the case of a malfunction, the automatic starting operation may be terminated. Malfunctions, for example, include communication with the traffic light system being terminated, communication with the leading transportation vehicle being terminated, or no further driving intention messages being received within a defined time interval. The driver of the transportation vehicle may be informed about the termination of the automatic starting function, as well as about reliable functioning of the automatic starting function.

The previously described method for semi-automated/automatic starting may be carried out not only in the area of an intersection in connection with a traffic light system, but also, for example, in the case of a shared on-ramp to a road or motorway and in traffic jam situations, as well as in the case of linking multiple transportation vehicles in a platoon behind a lead transportation vehicle, a so-called platoon transportation vehicle.

LIST OF REFERENCE CHARACTERS

10 Transportation vehicle
11 Control device
12 Camera
13 Apparatus
14 Input
15 Processing device
16 Vehicle-to-vehicle communication device
21 TLS starting transportation vehicle
22 to 24 Following transportation vehicle
25, 26 Transportation vehicle without platoon starting technology
31 TLS starting transportation vehicle
32 Following transportation vehicle
33 Transportation vehicle without platoon starting technology
34 Inner starting transportation vehicle
35 Following transportation vehicle
36 Transportation vehicle without platoon starting technology
41 TLS starting transportation vehicle
42 Transportation vehicle without platoon starting technology
43 Inner starting transportation vehicle
44, 45 Following transportation vehicle
46 Transportation vehicle without platoon starting technology
50 to 57 Operation

The invention claimed is:

1. A method for controlling a transportation vehicle, the method comprising:
   receiving a driving intention message from another transportation vehicle, wherein the driving intention message includes data indicating a planned starting operation of the another transportation vehicle, wherein the received driving intention message includes at least data for starting an engine of the another transportation vehicle;
   determining whether the another transportation vehicle is situated directly in front of the transportation vehicle; and
   in response to the another transportation vehicle being situated directly in front of the transportation vehicle, determining a parameter for controlling the transportation vehicle based on the received driving intention message, wherein the parameter for controlling the transportation vehicle includes at least data for starting an engine of the transportation vehicle based on the received driving intention message including data for starting the engine of the another transportation vehicle.

2. The method of claim 1, wherein the driving intention message comprises:
   a piece of position information about an instantaneous position of the another transportation vehicle;
   a planned start time for starting an engine of the another transportation vehicle;
   a planned acceleration profile of the another transportation vehicle;
   a planned speed profile of the another transportation vehicle;

a planned position profile of the another transportation vehicle; and/or a planned movement start time of the another transportation vehicle.

3. The method of claim 1, wherein the determination of whether the another transportation vehicle is situated directly in front of the transportation vehicle comprises:

determining traffic lane data indicating an occupancy of the traffic lane in front of the transportation vehicle; and/or comparing an instantaneous position of the transportation vehicle to an instantaneous position of the another transportation vehicle.

4. The method of claim 1, further comprising:

generating an additional driving intention message based on at least the parameter for controlling the transportation vehicle, wherein the generated additional driving intention message includes at least data for starting the engine of the transportation vehicle; and transmitting the generated additional driving intention message to other transportation vehicles via vehicle-to-vehicle communication.

5. The method of claim 1, further comprising:

receiving a traffic light message from a traffic light system; and determining the parameter for controlling the transportation vehicle based on the received traffic light message, wherein the traffic light message comprises:

data indicating a traffic light phase of the traffic light system, and/or data indicating a location of the traffic light system, and/or data indicating topology of an intersection.

6. The method of claim 5, wherein the traffic light message comprises a next green phase of the traffic light system, and wherein the method further comprises:

determining whether the transportation vehicle is able to pass through the traffic light system during the next green phase based on the received driving intention message and the received traffic light message, and determining the parameter for controlling the transportation vehicle based on at least the determination whether the transportation vehicle is able to pass through the traffic light system during the next green phase.

7. A method for controlling a transportation vehicle, the method comprising:

detecting data indicative of surroundings in front of the transportation vehicle;

determining a parameter for controlling the transportation vehicle based on the detected surroundings data, wherein the parameter for controlling the transportation vehicle includes at least data for starting an engine of the transportation vehicle;

generating a driving intention message based on the parameter for controlling the transportation vehicle, wherein the generated driving intention message includes at least data for starting the engine of the transportation vehicle; and transmitting the driving intention message to other transportation vehicles via vehicle-to-vehicle communication, wherein at least one of the other transportation vehicles determines a parameter for controlling the at least one of the other transportation vehicles based on the received driving intention message, and wherein the parameter for controlling the at least one of the other transportation vehicles includes at least data for starting an engine of the at least one of the other transportation vehicles based on the received driving intention message including data for starting the engine of the transportation vehicle.

8. The method of claim 7, wherein the detection of the data indicative of the surroundings comprises receiving a traffic light message from a traffic light system, and wherein the determination of the parameter for controlling the transportation vehicle is based on at least the received traffic light message, and/or wherein the detection of the data indicative of the surroundings comprises detecting a traffic situation in front of the transportation vehicle, and wherein the determination of the parameter for controlling the transportation vehicle is based on at least the detected traffic situation.

9. A device for controlling a transportation vehicle, the device comprising:

an input for receiving a driving intention message from another transportation vehicle, wherein the received driving intention message includes data indicating a planned starting operation of the another transportation vehicle, wherein the received driving intention message includes at least data for starting an engine of the another transportation vehicle; and a processing device configured to:

determine whether the another transportation vehicle is situated directly in front of the transportation vehicle, determine a parameter for controlling the transportation vehicle based on the received driving intention message, wherein the parameter includes at least data for starting an engine of the transportation vehicle based on the received driving intention message including data for starting the engine of the another transportation vehicle, and, control the transportation vehicle based on the parameter in response to a determination that the another transportation vehicle is situated directly in front of the transportation vehicle.

10. A device for controlling a transportation vehicle, the device comprising:

a detection device for detecting data indicative of surroundings in front of the transportation vehicle; and a processing device configured to:

determine a parameter for controlling the transportation vehicle based on the detected data indicative of the surroundings;

generate a driving intention message including data indicating a planned starting operation of the transportation vehicle, wherein the planning starting operation of the transportation vehicle includes at least data for starting an engine of the transportation vehicle; and transmit the generated driving intention message to other transportation vehicles via vehicle-to-vehicle communication, wherein at least one of the other transportation vehicles determines a parameter for controlling the at least one of the other transportation vehicles based on the received driving intention message, and wherein the parameter for controlling the at least one of the other transportation vehicles includes at least data for starting an engine of the at least one of the other transportation vehicles based on the received driving intention message including data for starting the engine of the transportation vehicle.

11. The method of claim 1, wherein the parameter for controlling the transportation vehicle includes data for starting movement of the transportation vehicle.

12. The method of claim 1, wherein data of the received driving intention message is determined based on information sensed by the another transportation vehicle.

* * * * *